US007016761B2

(12) United States Patent
You et al.

(10) Patent No.: US 7,016,761 B2
(45) Date of Patent: Mar. 21, 2006

(54) SYSTEM AND METHOD FOR MANUFACTURING CONTROL

(75) Inventors: Huei-Shyang You, Taoyuan (TW); Fu-Kuan Hsiao, Taipei (TW)

(73) Assignees: Industrial Technology Research Institute, Hsinchu (TW); Lumax International Corp., LTD, Taipei (TW)

( * ) Notice: Subject to any disclaimer, the term of this patent is extended or adjusted under 35 U.S.C. 154(b) by 0 days.

(21) Appl. No.: 10/947,200

(22) Filed: Sep. 23, 2004

(65) Prior Publication Data

US 2005/0131573 A1  Jun. 16, 2005

(30) Foreign Application Priority Data

Dec. 12, 2003  (TW) .............................. 92135177 A

(51) Int. Cl.
*G06F 19/00* (2006.01)
(52) U.S. Cl. .................................................. 700/175
(58) Field of Classification Search ................ 700/160, 700/169, 174, 175, 180; 702/182–187
See application file for complete search history.

(56) References Cited

U.S. PATENT DOCUMENTS

| | | | | |
|---|---|---|---|---|
| 5,602,761 A | * | 2/1997 | Spoerre et al. | ............. 702/179 |
| 2002/0152056 A1 | * | 10/2002 | Herzog et al. | ................ 703/2 |
| 2003/0144746 A1 | * | 7/2003 | Hsiung et al. | ................ 700/28 |

\* cited by examiner

*Primary Examiner*—Albert W. Paladini
*Assistant Examiner*—Chad Rapp
(74) *Attorney, Agent, or Firm*—Birch, Stewart, Kolasch & Birch, LLP

(57) ABSTRACT

A real-time monitoring system and method for processes or tools. Historical data for processes or tools is first collected and abnormal data then analyzed using statistical analysis. At least one control chart model is designated according to the analysis result, and model parameters and linking settings related to control chart models are stored in a database. Next, a real-time monitoring model is created by merging control chart models, using model-creating technologies, according to abnormal-state causes, the model parameters, and the linking settings, and several monitoring models are then merged as a real-time monitoring model. Finally, operating states of the processes or tools are displayed using the real-time monitoring model according to real-time data or the historical data stored in the database.

18 Claims, 6 Drawing Sheets

SYSTEM AND METHOD FOR MANUFACTURING CONTROL

This Non-provisional application claims priority under 35 U.S.C. § 119(a) on Patent Application No(s). 092135177 filed in Taiwan, Republic of China on Dec. 12, 2003, the entire contents of which are hereby incorporated by reference.

BACKGROUND

The present invention relates to a monitoring system and method for manufacturing control, and in particular to a real-time monitoring system and method for processes or tools.

Abnormal states occur in manufacturing processes due to control conditions affecting process tools, with modification thereof displayed in a single interface.

Normally, a single interface displays one control condition while a complex monitoring interface displays a plurality of control conditions. Numerous control conditions and corresponding abnormal states of present processes or tools, however, are provided as a baseline. In addition, numerous abnormal states for one process or tool are sometimes monitored. Thus, existing single and complex monitoring interfaces cannot satisfy requirements.

SUMMARY

Accordingly, an object of the present invention is to provide a real-time monitoring method for abnormal process or tool states with combined monitoring models.

Another object of the present invention is to provide a real-time monitoring system for abnormal process or tool states, merging a plurality of monitoring pages, each comprising a plurality of real-time monitoring models.

Accordingly, embodiments of the present invention provide a real-time monitoring method for abnormal process or tool states. First, historical data of process or tools in normal and abnormal operation is collected, and the data related to abnormal process states or abnormal process tool states is analyzed, obtaining abnormal-state causes. One or more applicable control chart models are designated according to the abnormal-state causes and a functional model library, thus obtaining model parameters of the control chart models and linking settings therebetween, both stored in a database.

Next, a real-time monitoring model is created according to the abnormal-state causes, model parameters of the control chart models, and linking settings therebetween. Further, a complex real-time monitoring interface is generated by merging a plurality of the real-time monitoring models. Finally, the real-time monitoring interface displays the operating states according to real-time data or the historical data stored in the database.

Embodiments of the present invention further provide a real-time monitoring interface for complex abnormal process or tool states, comprising a monitoring region, a state display region, an abnormal state display region, an information region, and a model name display region.

The monitoring region, comprising a plurality of monitoring pages, displays operating states of processes or process tools. Each monitoring page comprises a plurality of real-time monitoring models and each monitoring model is created by merging at least one control chart model. The abnormal state display region displays abnormal states.

The state display region displays states of the real-time monitoring pages, which indicates abnormal states in different colors. The information region displays fundamental information of one real-time monitoring model. The model name display region displays component names of one real-time monitoring model.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The patent or application file contains at least one drawing executed in color. Copies of this patent or patent application publication with color drawing(s) will be provided by the office upon request and payment of the necessary fee.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION

The present invention discloses a real-time monitoring system and method for abnormal processes or process tool states and a real-time monitoring interface thereof.

First Embodiment

Figure 1:
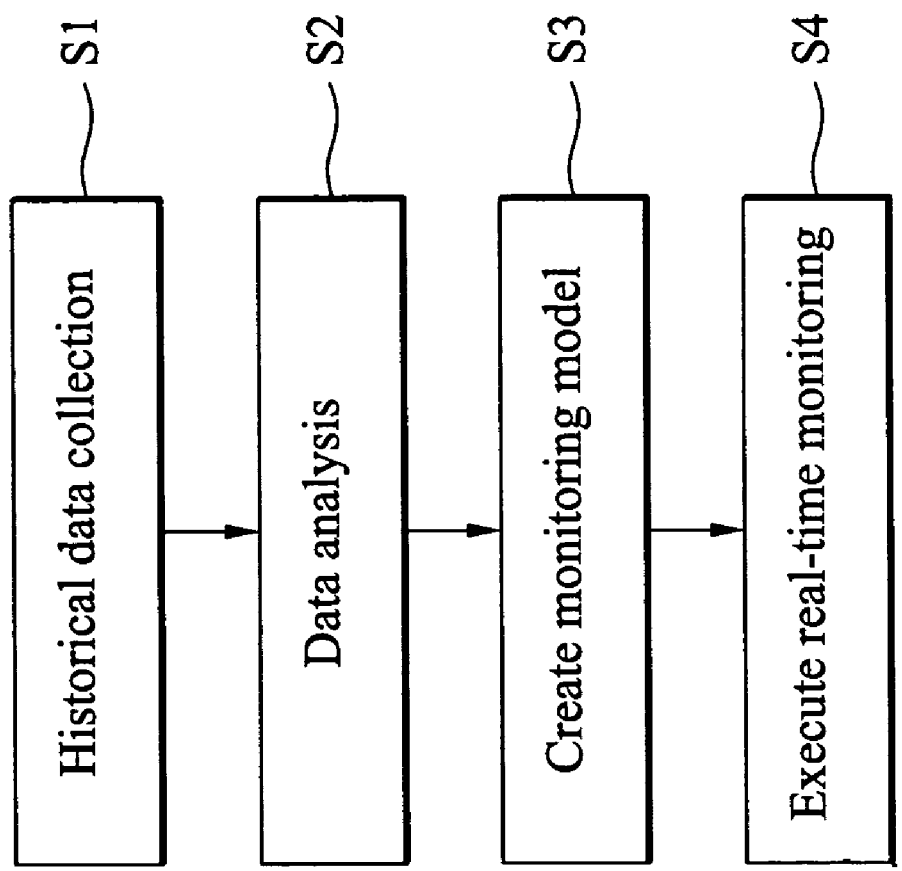
FIG. 1 is a flowchart showing the real-time monitoring method of a first embodiment of the present invention.

FIG. 1 is a flowchart showing the real-time monitoring method of a first embodiment of the present invention.

In step S1, historical data, comprising time and process events and rule-based experience, of processes or process tools for normal and abnormal operations is collected.

In step S2, data related to abnormal processes or process tool states is analyzed using statistical analysis techniques, comprising situation prediction, residue analysis, and health index, to obtain abnormal-state causes. One or more applicable control chart models, comprising trend charts, variable control charts, attribute control charts, multivariate control charts, complex health index, and situation (T/F) display, are designated according to the abnormal-state causes and a functional model library, thereby obtaining model parameters of the control chart models and linking settings therebetween, both stored in a database.

In step S3, a real-time monitoring model is created according to the abnormal-state causes, model parameters, and linking settings, using data-driven/model based mode, rule-based mode, or trend-based mode modeling techniques, merging the control chart models. The real-time monitoring model, referred to as Bull Model, is complex and model-oriented. Further, a complex real-time monitoring interface is created by merging a plurality of the real-time monitoring models. Settings corresponding to the monitoring models are stored in the database.

Control charts are embedded in the monitoring models, and the result of real-time calculation relating to each monitoring model is displayed in the complex real-time monitoring interface. The monitoring interface comprises a maximum of six monitoring pages, each page displaying a maximum of six monitoring Bull models.

In step S4, real-time monitoring data is gathered or historical data is accessed from the database through the complex real-time monitoring interface, with a combination of abnormal rules and model comparison, to output determination signals for the processes or process tools.

Second Embodiment

Figure 2:
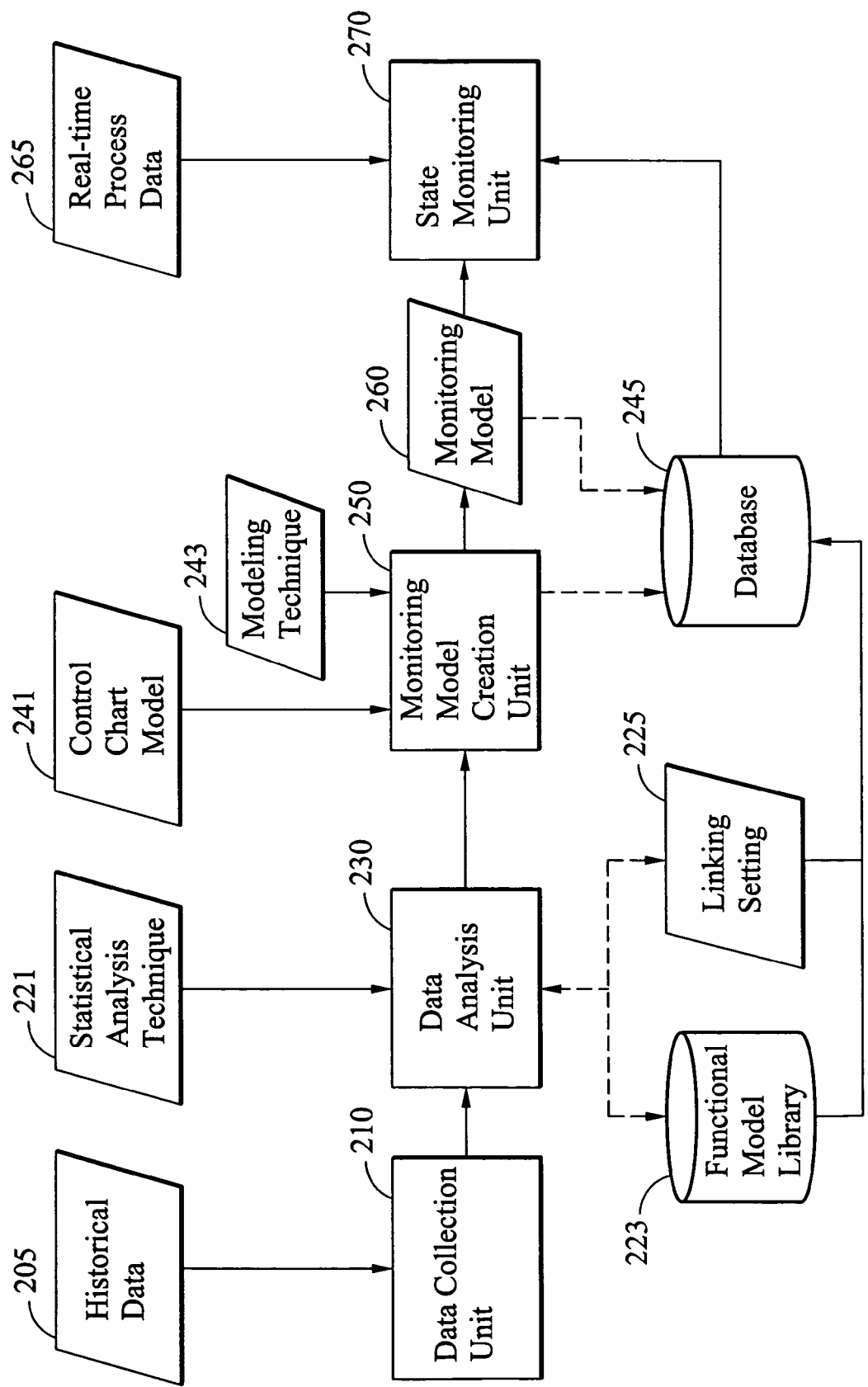
FIG. 2 is a schematic diagram of the architecture of the monitoring system of a second embodiment of the present invention.

FIG. 2 is a schematic diagram of the architecture of the monitoring system of a second embodiment of the present invention. The system comprises a data collecting unit 210, a data analysis unit 230, a monitoring model creation unit 250, and a state monitoring unit 270.

Data collecting unit 210 collects historical data 205 of processes or process tools. Data analysis unit 230 analyzes historical data 205 using statistical analysis techniques 221 to obtain abnormal-state causes for the process or tools, and designates control chart models 241 according to the abnormal-state causes, thereby obtaining model parameters of the control chart models and linking settings 225 therebetween, both stored in a database 245.

Monitoring model creation unit 250 creates real-time monitoring models 260 according to a functional model library 223, the abnormal-state causes, model parameters, and linking settings 225, using modeling techniques 243, and generates a complex real-time monitoring interface by merging real-time monitoring models 260. Settings corresponding to monitoring models 260 are stored in database 245.

State monitoring unit 270 displays the operating states of the process or tools using the complex real-time monitoring interface according to real-time data 265 or the historical data 205 stored in the database 245.

Third Embodiment

Figure 3:
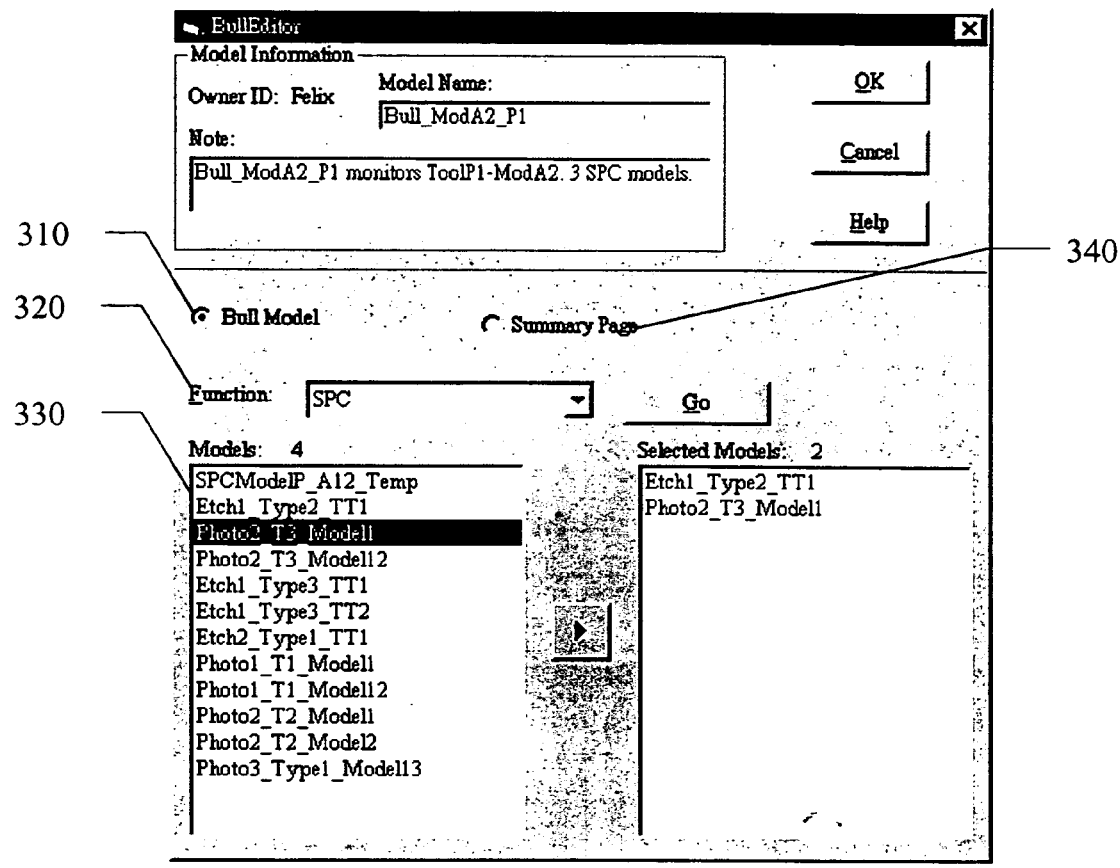
FIG. 3 is a schematic diagram of an interface for creating a real-time monitoring model of a third embodiment of the present invention.

FIG. 3 is a schematic diagram of an interface for creating a real-time monitoring model of a third embodiment of the present invention. Referring to the architecture shown in FIG. 2, after analysis of abnormal process or tool states, applicable models are designated from a functional model library according to the analysis result, creating prediction models in accordance with historical data, with model parameters and corresponding linking settings stored in a database. Next, a real-time monitoring model, the Bull model, is created using data-driven/model based mode, rule-based mode, and trend-based mode modeling techniques.

As shown in FIG. 3, Bull Model 310 is selected and a model category is chosen from a Function menu 320, thereby predefined control chart models displayed in a region 330 for selection. SPC category, for example, is chosen from Function menu 320, Etch1_Type2_TT1 and Photo2_T3_Model1 models are selected, and pressing the OK button creates a real-time monitoring model named Bull_ModA2_P1.

Figure 4:
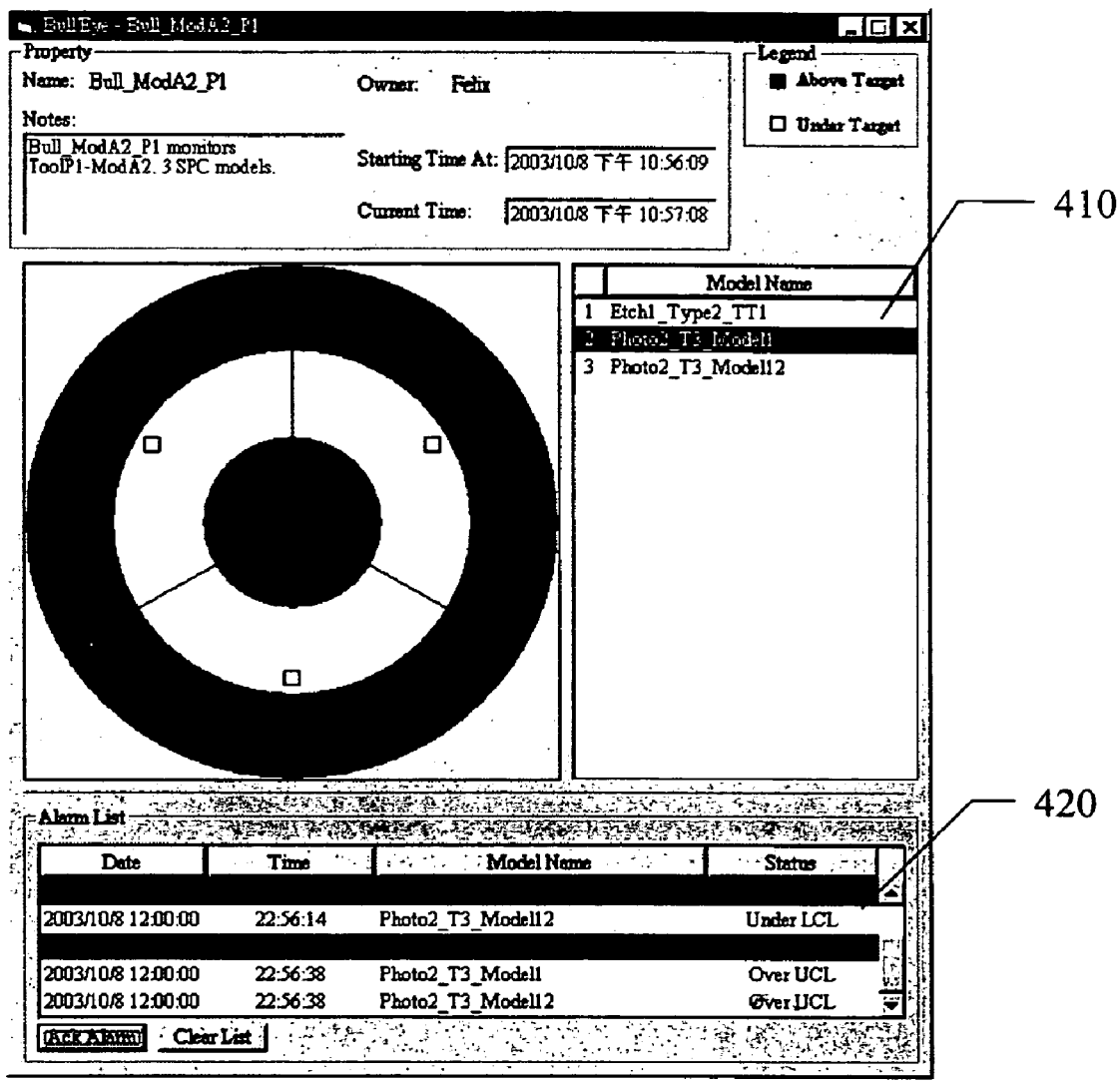
FIG. 4 is a schematic diagram of a specific real-time monitoring model of the third embodiment of the present invention.

FIG. 4 is a schematic diagram of a specific real-time monitoring model of a third embodiment of the present invention. The real-time monitoring model created in FIG. 3 is shown in FIG. 4 with selected models displayed in region 410, and monitoring information and states displayed in "Alarm List" region 420.

Figure 5:
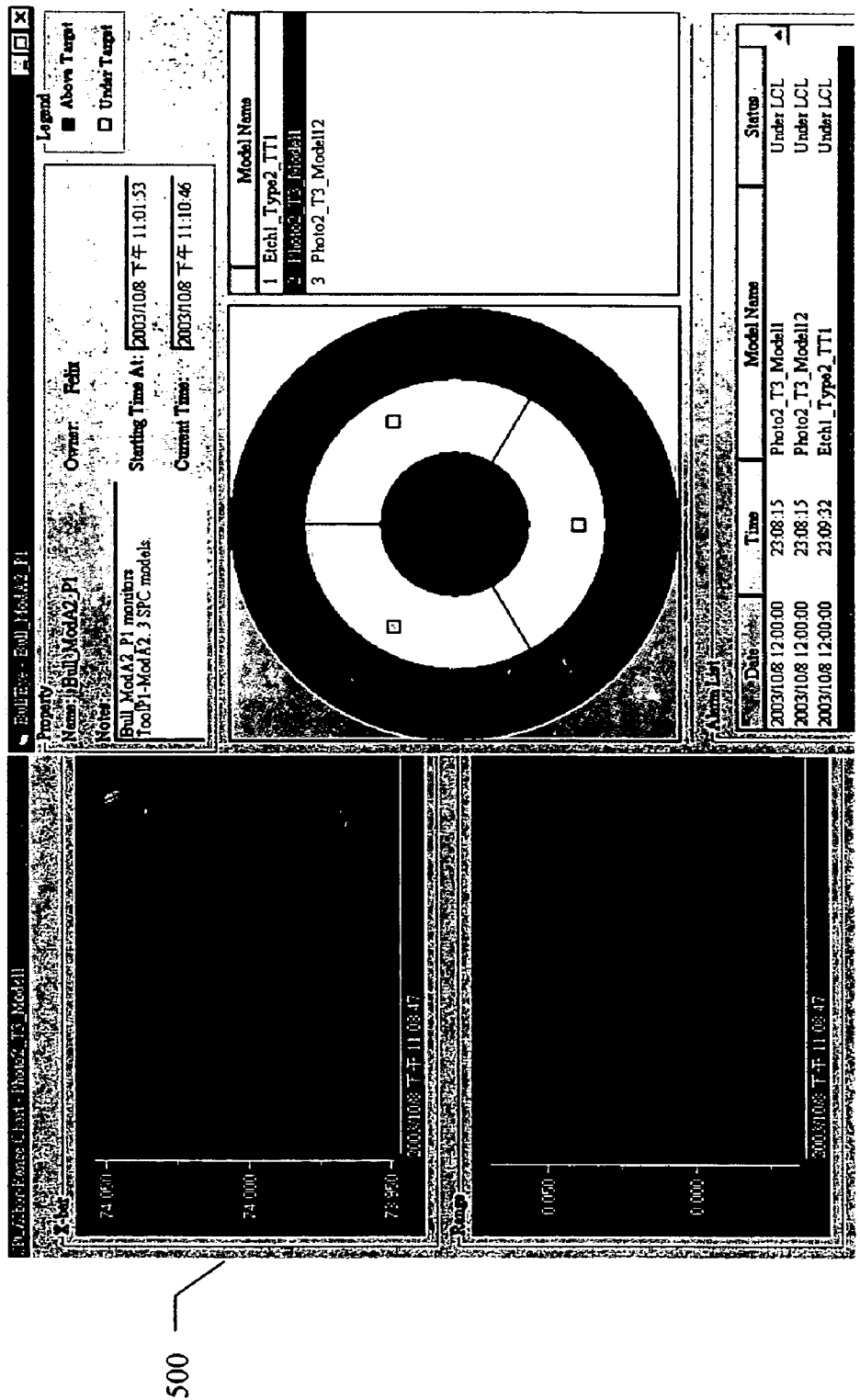
FIG. 5 is a schematic diagram of control chart models of a specific real-time monitoring model of the third embodiment of the present invention.

FIG. 5 is a schematic diagram of control chart models of a specific real-time monitoring model of a third embodiment of the present invention. "Photo2_T3_Model1" model, for example, is selected and corresponding information and states are displayed in region 500.

Figure 6:
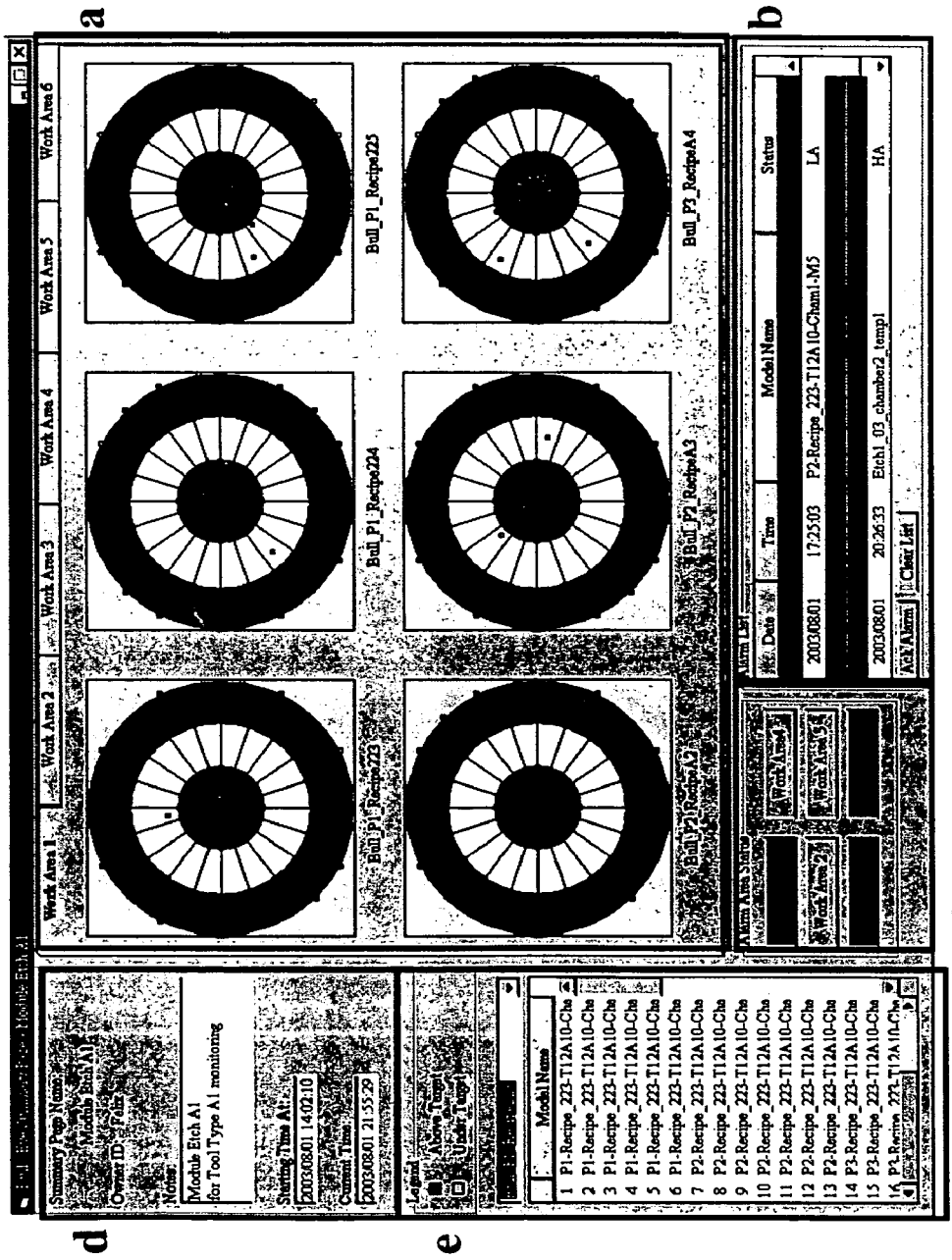
FIG. 6 is a schematic diagram of the complex real-time monitoring interface of the third embodiment of the present invention.

FIG. 6 is a schematic diagram of the complex real-time monitoring interface of a third embodiment of the present invention. A "Summary Page" item 340 shown in FIG. 3 is selected, displaying predefined real-time monitoring models for selection, and pressing the OK button generates a complex real-time monitoring interface, comprising a plurality of monitoring pages.

The complex real-time monitoring interface comprises a monitoring region a, an abnormal state display region b, a state display region c, an information region d, and a model name display region e.

Monitoring region a, comprising six real-time monitoring pages, displays operating states of processes or tools, with each page comprising six real-time monitoring models, each of which is created by merging a maximum of twenty control chart models. Monitoring states are displayed using data-driven/model based, rule-based, or trend-based control chart models. Further, alarm messages are represented by color, green for normal states, yellow for warning states, and red for abnormal states.

Abnormal state display region b displays abnormal process or tool states, with the Ack button registering confirmation.

State display region c displays monitoring pages with abnormal states by performing an "OR Gate" logic calculation, showing the monitored condition by color.

Information region d displays fundamental information of one real-time monitoring model.

Model name display region e displays component names of one real-time monitoring model.

Embodiments of the present invention enable creation of applicable real-time monitoring models using appropriate modeling techniques and tools. Historical data analysis, selection of control modes, and creation of control charts are all enabled while offline, and real-time calculation enabled for real-time reports and alarms. The real-time monitoring interface governs considerable indices or states of control chart models, displayed in a single interface. In addition, embodiments of the present invention enable association with different situations and targets for modeling monitoring proposals, integrated into a monitoring interface for improved monitoring efficiency and quality discrepancy among different processes or tools.

While embodiments of the invention have been described by way of example and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A real-time monitoring method for abnormal process or tool states, comprising the steps of:
   collecting historical data for a plurality of processes or tools;
   analyzing the historical data and obtaining abnormal-state causes for the processes or tools;
   designating at least one control chart model according to the abnormal-state causes, thereby obtaining model parameters of the control chart model and linking settings therebetween, both stored in a database;
   creating a real-time monitoring model according to the abnormal-state causes, model parameters, and linking settings, wherein the real-time monitoring model is a complex and model-oriented Bull model;
   generating a real-time monitoring interface by merging a plurality of the real-time monitoring models; and
   the real-time monitoring interface displaying the-operating states of the processes or tools according to real-time data or the historical data stored in the database.

2. The method as claimed in claim 1, wherein the real-time monitoring interface comprises a first specific number of real-time monitoring pages, each comprising a second specific number of the real-time monitoring models.

3. The method as claimed in claim 2, wherein the first specific number is six.

4. The method as claimed in claim 2, wherein the second specific number is six.

5. The method as claimed in claim 1, wherein the historical data comprises time and process events and rule-based experience.

6. The method as claimed in claim 1, wherein analysis is implemented using statistical analysis technologies, comprising situation prediction, residue analysis, or health index.

7. The method as claimed in claim 1, wherein each control chart model is a trend chart, variable control chart, attribute control chart, multivariate control chart, complex health index, or situation (T/F) display.

8. The method as claimed in claim 1, wherein designation is implemented further referring a functional model library.

9. The method as claimed in claim 1, wherein creation of the real-time monitoring model further uses a data-driven/model based mode, rule-based mode, or trend-based mode modeling technique, merging the control chart models.

10. A real-time monitoring system for abnormal process or tool states, comprising:
    a data collection unit, collecting historical data for a plurality of processes or tools;
    a data analysis unit, coupled to the data collection unit, analyzing the historical data to obtain abnormal-state causes for the processes or tools, and designating control chart models according to the abnormal-state causes, thereby obtaining model parameters of the control chart models and linking settings therebetween, both stored in a database;
    a monitoring model creation unit, coupled to the data analysis unit, creating a real-time monitoring model according to the abnormal-state causes, the model parameters, and the linking settings, and generating a real-time monitoring interface by merging a plurality of the real-time monitoring models, wherein the real-time monitoring model is a complex and model-oriented Bull model; and
    a state monitoring unit, coupled to the monitoring model creating unit, displaying operating states of the processes or tools using the real-time monitoring interface according to real-time data or the historical data stored in the database.

11. The system as claimed in claim 10, wherein the real-time monitoring interface comprises six real-time monitoring pages, each comprising six real-time monitoring models.

12. The system as claimed in claim 10, wherein the historical data comprises time and process events and rule-based expert experiences.

13. The system as claimed in claim 10, wherein the data analysis unit enables analysis of the historical data using statistical analysis technologies comprising situation prediction, residue analysis, or health index.

14. The system as claimed in claim 10, wherein each control chart model is a trend chart, variable control chart, attribute control chart, multivariate control chart, complex health index, or situation (T/F) display.

15. The system as claimed in claim 10, wherein the monitoring model creation unit further designates at least one control chart model according to a functional model library.

16. The system as claimed in claim 10, wherein creation of the real-time monitoring model further uses a data-driven/model based mode, rule-based mode, or trend-based mode modeling technique, merging the control chart models.

17. The system as claimed in claim 10, wherein the data collecting unit, the data analysis unit, and the monitoring model creation unit perform monitoring operations while offline.

18. A real-time monitoring interface for complex abnormal process or tool states, comprising:
    a monitoring region, displaying operating states of a plurality of process tools, comprising a plurality of real-time monitoring pages, wherein each monitoring page comprises a plurality of real-time monitoring models, and each real-time monitoring model is created by merging at least one control chart model;
    a abnormal state display region, displaying abnormal states;
    a state display region, displaying states of the real-time monitoring pages, indicating abnormal states in different colors;
    an information region, displaying fundamental information for one real-time monitoring model; and
    a model name display region, displaying information for one control chart model of one real-time monitoring model.

* * * * *